United States Patent
van Horne et al.

(10) Patent No.: US 11,727,470 B2
(45) Date of Patent: Aug. 15, 2023

(54) OPTICAL SCANNING FOR WEIGHTS AND MEASURES

(71) Applicant: Maplebear, Inc., San Francisco, CA (US)

(72) Inventors: Camille van Horne, San Francisco, CA (US); Sean Cashin, San Francisco, CA (US)

(73) Assignee: Maplebear, Inc., San Francisco, CA (US)

( * ) Notice: Subject to any disclaimer, the term of this patent is extended or adjusted under 35 U.S.C. 154(b) by 278 days.

(21) Appl. No.: 17/068,594

(22) Filed: Oct. 12, 2020

(65) Prior Publication Data

US 2022/0114648 A1    Apr. 14, 2022

(51) Int. Cl.
| | | |
|---|---|---|
| *G06Q 30/06* | (2023.01) | |
| *G06Q 30/0601* | (2023.01) | |
| *G06Q 30/0201* | (2023.01) | |
| *G06Q 40/12* | (2023.01) | |
| *G06Q 20/08* | (2012.01) | |
| *G06Q 10/0875* | (2023.01) | |
| *G06Q 20/04* | (2012.01) | |
| *G06V 10/98* | (2022.01) | |
| *G06V 30/416* | (2022.01) | |
| *G06F 18/214* | (2023.01) | |
| G06Q 20/32 | (2012.01) | |
| G06Q 10/083 | (2023.01) | |
| G06V 30/10 | (2022.01) | |

(52) U.S. Cl.
CPC ....... *G06Q 30/0635* (2013.01); *G06F 18/214* (2023.01); *G06Q 10/0875* (2013.01); *G06Q 20/047* (2020.05); *G06Q 20/085* (2013.01); *G06Q 30/0206* (2013.01); *G06Q 30/0641* (2013.01); *G06Q 40/12* (2013.12); *G06V 10/993* (2022.01); *G06V 30/416* (2022.01); G06Q 10/083 (2013.01); G06Q 20/326 (2020.05); G06V 30/10 (2022.01)

(58) Field of Classification Search
CPC ...... G06Q 20/322; G06Q 10/10; G06Q 30/08; G06V 30/413; G06V 30/19013; G06V 10/40; G06F 40/295; G06F 16/5838
USPC .......................... 705/26.8; 235/383; 382/209
See application file for complete search history.

(56) References Cited

U.S. PATENT DOCUMENTS

| | | | |
|---|---|---|---|
| 11,257,049 B1* | 2/2022 | Durazo Almeida | G06V 30/413 |
| 2003/0102373 A1* | 6/2003 | Swartz | G07G 1/0054 |
| | | | 235/383 |

(Continued)

OTHER PUBLICATIONS

PCT International Search Report and Written Opinion, PCT Application No. PCT/US2021/054418, dated Jan. 21, 2022, 13 pages.

*Primary Examiner* — Olusegun Goyea
(74) *Attorney, Agent, or Firm* — Fenwick & West LLP

(57) ABSTRACT

A customer places an order of items to be purchased with an online concierge system. The online concierge system provides the order to a picker who shops for the items at a retailer and delivers them. The online concierge system requests an image of a receipt of the order from the picker. The online concierge system performs image processing on the image of the receipt and uses machine learning and optical character recognition to determine the actual amounts purchased of items. The online concierge system charges the customer based on the actual amounts purchased of each item.

20 Claims, 14 Drawing Sheets

(56) References Cited

U.S. PATENT DOCUMENTS

| | | | |
|---|---|---|---|
| 2008/0152231 A1* | 6/2008 | Gokturk | G06V 10/40 |
| | | | 382/209 |
| 2008/0265026 A1 | 10/2008 | Silverbrook et al. | |
| 2013/0080289 A1* | 3/2013 | Roy | G06Q 20/322 |
| | | | 705/26.8 |
| 2020/0057903 A1* | 2/2020 | Leizerowich | G06F 40/295 |
| 2021/0158038 A1* | 5/2021 | Shanmuganathan | |
| | | | G06V 30/19013 |

* cited by examiner

US 11,727,470 B2

OPTICAL SCANNING FOR WEIGHTS AND MEASURES

BACKGROUND

This disclosure relates generally to a process for improving accuracy of a delivery system, and specifically to determining an item quantity based on image analysis of a physical receipt by a computer system.

In current delivery systems, shoppers, or "pickers," fulfill orders at a physical warehouse, such as a retailer, on behalf of customers as part of an online shopping concierge service. The delivery system provides customers with a user interface that displays an inventory catalog listing items that a customer can add to an order, specifying a quantity of each item. Many items are measured in quantities that are straightforward, such as a dozen eggs, a gallon of milk, or one loaf of bread. Other items may be quantified in weights or other measures that are more difficult to precisely match the quantity specified by the customer. For example, a customer may order 1.0 lb. of apples. At the retailer, the shopper picks 3 apples, which weigh in total 0.96 lbs. An additional apple would bring the total weight significantly over the quantity specified by the customer. However, if the customer pays for the full specified 1.0 lbs. of apples, the customer is being overcharged. In current delivery systems, there is no efficient means for reconciling prices of quantities ordered by a customer and quantities purchased by a shopper for items that have variable weights and measured quantities.

SUMMARY

As described herein, a delivery system generates and uses machine-learned models to identify items and corresponding actual amount purchased in an image of a receipt of an order. In some embodiments, the delivery system identifies items that can be purchased in variable amounts, such as items purchased by weight. The machine-learned models are trained using images of physical receipts, where pickers upload the images of receipts and input known actual amounts purchased. The training data are used to build a deep-learning detection model capable of determining whether the receipt is readable and, if so, to identify items and measured quantities in the receipt representing the actual amounts purchased. The identified measured quantities can be used to charge a customer who placed the order a correct cost for the actual amount purchased.

A method for reconciling cost discrepancies between ordered and purchased amounts of items with variable weights includes receiving an order of items with specified amounts of each item. Each item is associated with a price that is dependent on the actual amount of the item purchased. The method determines an estimated cost of the order based on the price and the ordered amounts of each item. The method sends the order to a shopper for fulfilment at a store. The method receives an image of a receipt for the order from the shopper after fulfilment of the order. The method scans the receipt, using image processing, to identify the items in the receipt. The method identifies a measured quantity associated with each item, the measured quantity representing the actual amount of the item purchased at the store. The method determines an actual price of each item in the order and determines a total cost of the order based on the actual prices.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
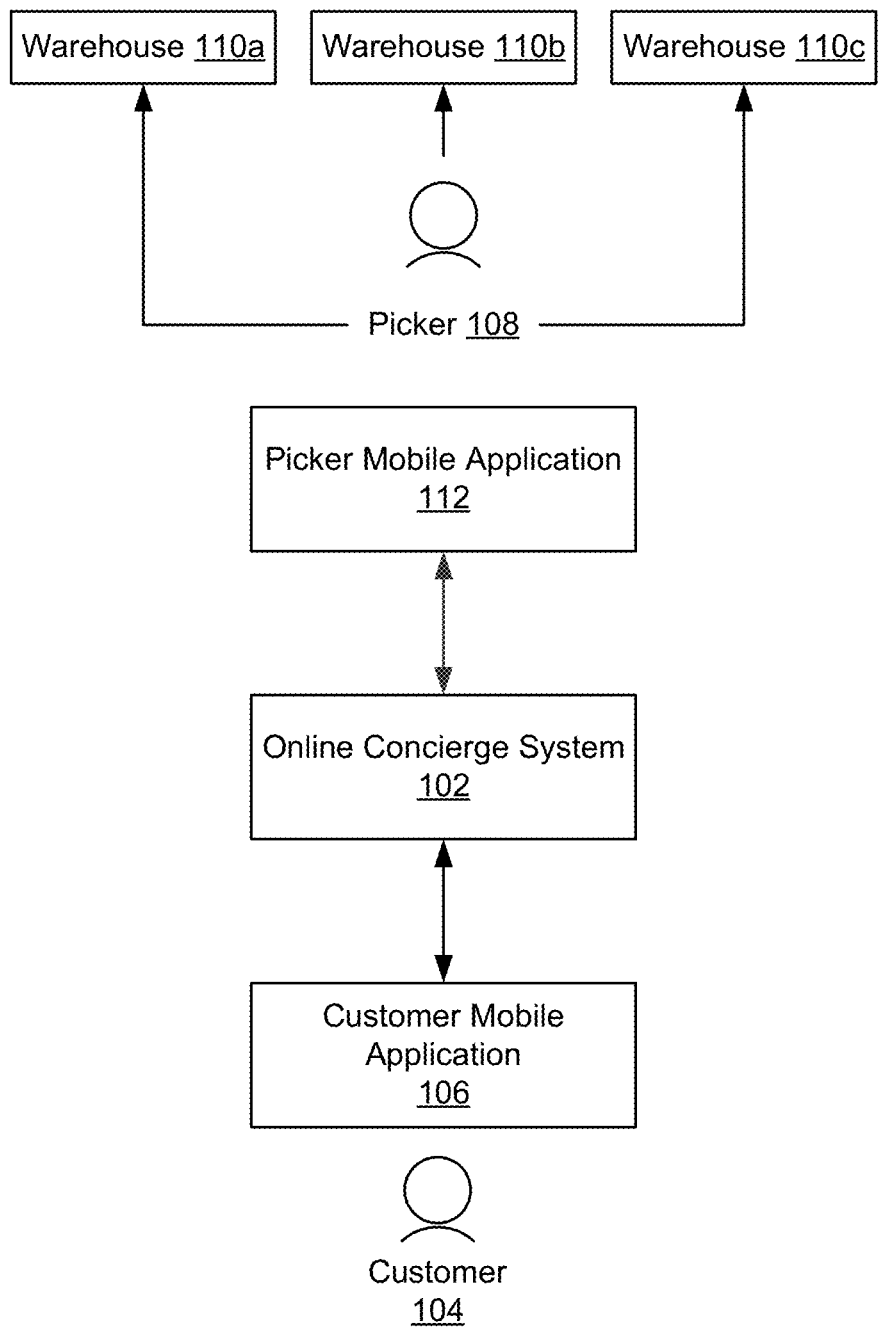
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The online concierge system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer 104 may use a customer mobile application (CMA) 106 to place the order; the CMA 106 is configured to communicate with the online concierge system 102.

The online concierge system 102 is configured to transmit orders received from customers 104 to one or more pickers 108. A picker 108 may be a contractor, employee, or other person (or entity) who is enabled to fulfill orders received by the online concierge system 102. The picker 108 travels between a warehouse and a delivery location (e.g., the customer's home or office). A picker 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to customers. Each picker 108 fulfills an order received from the online concierge system 102 at one or more warehouses 110, delivers the order to the customer 104, or performs both fulfillment and delivery. In one embodiment, pickers 108 make use of a picker mobile application (PMA) 112 which is configured to interact with the online concierge system 102.

Figure 2:
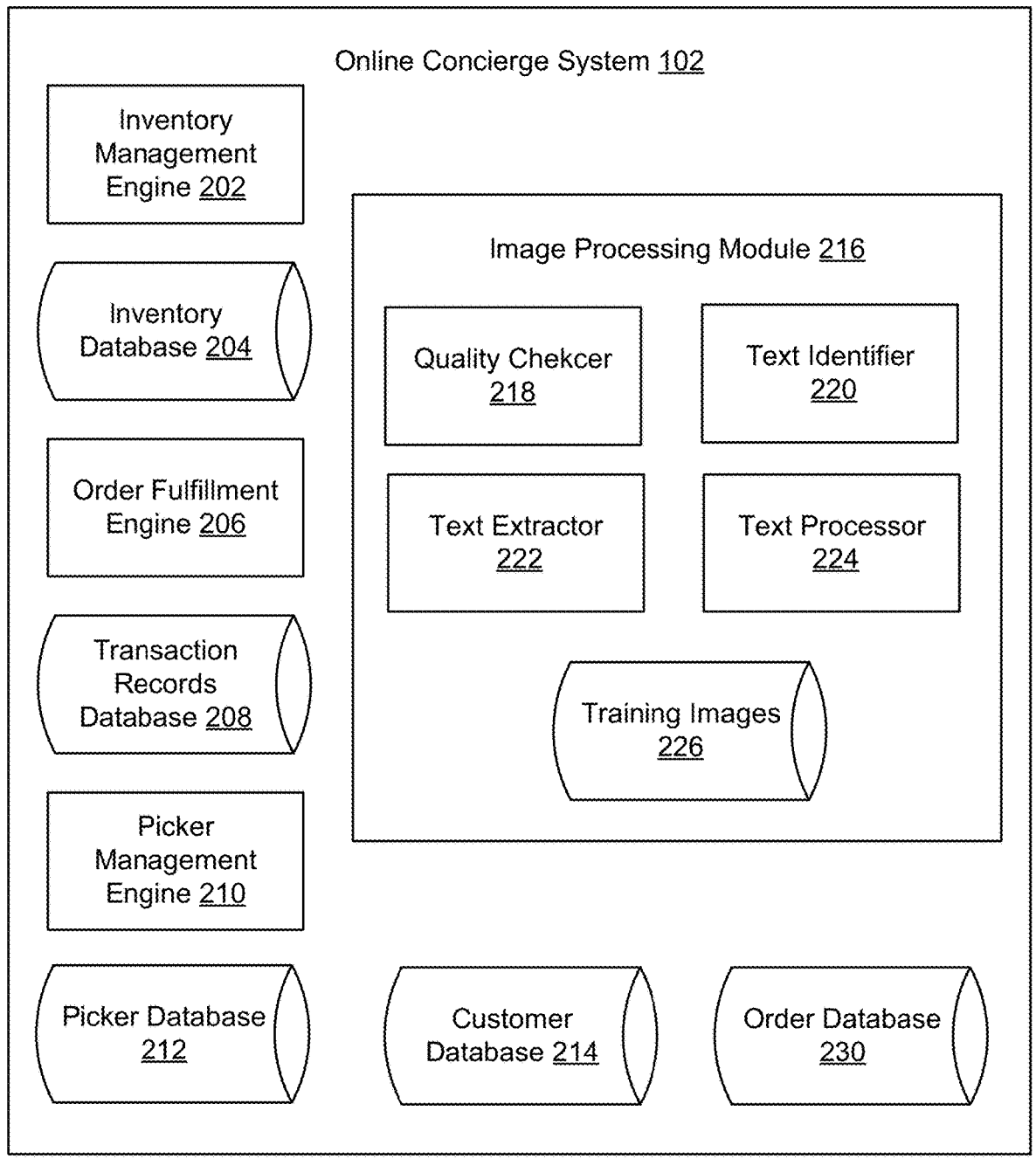
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both quantitative and qualitative information about items, including size, color, weight, SKU, serial number, and so on. The inventory database includes pricing information about each item, such as a unit price, a price per weight, a price per quantity (e.g., the price of a 6-pack of a juice may be more than half of the price of a 12-pack of the same juice), and/or an estimated price thereof (e.g., prices of produce may vary based on season and availability of the produce). The inventory database 204 also stores information about various item properties, such as vegan, organic, gluten free, etc. The inventory database 204 also stores purchasing rules associated with each item, if they exist. For example, age-restricted items such as alcohol and tobacco are flagged accordingly in the inventory database 204. The inventory management engine 202 may receive updated item information from a picker 104, such as a property of an item in an inventory database 204, and adds the updated item information to the inventory database 204.

The online concierge system 102 includes an order fulfillment engine 206 which is configured to synthesize and display an ordering interface to each customer 104 (for example, via the CMA 106). The order fulfillment engine 206 is also configured to access an inventory database 204 in order to determine which items are available at which warehouses 110, and to identify properties associated with the items. The order fulfillment engine 206 determines a sale price for each item ordered by a customer 104. In one embodiment, the order fulfillment engine determines an estimated price for an order as a whole, based on the sale prices of each item. Prices set by the order fulfillment engine 206 may or may not be identical to in-store prices determined by retailers (which is the price that customers 104 and pickers 108 would pay at retail warehouses). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the picker 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In one embodiment, the picker management engine 210 receives a new order from the order fulfillment engine 206. The picker management engine 210 identifies the appropriate warehouse to fulfill the order based on one or more parameters, such as a probability of item availability, the contents of the order, the inventory of the warehouses, and the proximity to the delivery location. The picker management engine 210 then identifies one or more appropriate pickers 108 to fulfill the order based on one or more parameters, such as the pickers' proximity to the appropriate warehouse 110 (and/or to the customer 104), his/her familiarity level with that particular warehouse 110, and so on. For example, the picker management engine 210 identifies pickers by comparing the parameters to data retrieved from a picker database 212. The picker database 210 stores information describing each picker 108, such as his/her name, gender, rating, previous shopping history, and so on.

As part of fulfilling an order, the order fulfillment engine 206 and/or picker management engine 210 may also access a customer database 214 which stores information describing each customer. This information could include each customer's name, address, gender, shopping preferences, favorite items, stored payment instruments, and so on.

The order fulfillment engine 206 interacts with the image processing module 216 to adjust an estimated cost of an order based on an image of a receipt that contains actual amounts purchased of items. In one embodiment, the order fulfillment engine 206 determines an estimated price of the order based on ordered quantities of items. Upon receiving an image of the receipt for the order, the image processing module 216 determines a price adjustment based on the difference between an ordered amount and an actual amount purchased of each item. Based on the price adjustment, the order fulfillment engine 206 charges the payment instrument associated with the customer 104 an adjusted cost for the order.

In another embodiment, the order fulfillment engine 206 first charges the payment instrument the estimated price of the order. The image processing module 216 determines the price adjustment, and if the actual amount purchased is less than the ordered amount, the order fulfillment engine 206 reimburses the customer 104 the price adjustment. If the actual amount purchased is greater than the ordered amount, the order fulfillment engine 206 charges the payment instrument associated with the customer 104 the price adjustment. Furthermore, the order fulfillment engine 206 may adjust the cost charged for an order based on a net sum of the differences between the ordered amount and actual amount purchased of each item in the order. That is, the order fulfillment engine 206 may determine a price adjustment for each item in the order and charge or reimburse the customer 104 for the order as a whole based on a net sum of the price adjustments.

As part of fulfilling an order, the order fulfillment engine 206 and/or image processing module 216 may also access an order database 230 which stores information describing each order. This information may include a set of items included in an order, a price per unit of each item, a quantity of each item, a total price per item, information about the customer 104 who placed the order, information about the picker 108 who is picking the order, a specified warehouse 110, or mappings to such information as stored in the inventory database 204, the transaction records database 208, the picker database 212, and/or the customer database 214. Additionally, the order database 230 may include information about the status of the order such as an order date, a fulfillment date or estimated fulfillment date, a delivery time or estimated delivery time or window, and one or more images of the order receipt. The image of the receipt is processed by the image processing module 216.

Image Processing

The online concierge system 102 includes an image processing module 216 for processing images of receipts associated with orders. After fulfillment of an order, an image of a receipt of the order is received at the online concierge system 102, for example from the picker 108 via the PMA 112. The online concierge system 102 then stores the image in the order database 230. The image of the receipt is analyzed by the image processing module 216, which uses one or more image processing algorithms as discussed below to extract text associated with items, weights, and/or prices on the receipt from the image of the receipt. In some embodiments, the image processing module 216 may be partially or wholly implemented by a third-party or a cloud-based model. In some embodiments, the image processing module 216 includes a quality checker 218, a text identifier 220, a text extractor 222, and a text processor 224. The image processing module 216 may also store a set of training images 226.

The quality checker 218 determines whether the image is of sufficient quality to resolve the text of the receipt. An image is of sufficient quality, for example, if the image is of a receipt and not blurry. If the quality checker 218 determines the image is of sufficient quality, the image processing continues. If the quality checker 218 determines the image is not of sufficient quality, the image processing module 216 returns via the PMA 112 a prompt to the picker 108 to take another image of the receipt.

The quality checker 218 may be implemented as a machine learning model trained on training images 226 to determine whether the image is of sufficient quality. For example, the quality checker 218 may be trained on training images 226 that include both positive images of receipts (i.e., show a clear and itemized receipt) and negative images of receipts (i.e., are blurry images, images of objects other than receipts). In other embodiments, the quality checker 218 may determine the variance of a fast Fourier transform of the image to determine whether the image is blurry.

The text identifier 220 determines locations of text within the image of the receipt. In some embodiments, the text identifier 220 is a machine learning model trained on the training images 226. The text identifier 220 obtains a bounding box for instances of text in the image of the receipt. In some embodiments, the text identifier 220 and the quality checker 218 may be one machine learning model that returns a null set of bounding boxes if the text cannot be resolved, i.e., the image is not of sufficient quality.

The text extractor 222 determines the words and numerical values of the text contained within the image of the receipt. In some embodiments, the text extractor 222 applies one or more optical character recognition (OCR) algorithms to the bounding boxes determined by the text identifier 220. In embodiments without the text identifier 220, the text extractor applies OCR to the whole image to determine the text within the receipt.

The text processor 224 analyzes the text determined by the text extractor 222 to determine items and their associated amount purchased. That is, the text processor 224 identifies text associated with an item description. The text processor 224 further identifies an amount and total price associated with the item. The text processor 224 can identify amounts that are whole values (e.g., 4 bananas) and amounts that are measured quantities (e.g., 0.96 lbs. of apples) associated with variable weight items. The text processor 224 may specifically classify amounts as whole values and measured quantities. The measured quantities representing the actual amount purchased can be compared by the order fulfillment engine 206 to the ordered amount of the item such that the customer 104 is charged appropriately for the variable weight item. In one embodiment, the measured quantities and image of the receipt may be sent for display to one or more auditors via an auditor mobile application, which is connected to the online concierge system 102. The one or more auditors may approve or reject the measured quantities in view of the receipt. If the auditors reject the measured quantities, they may enter one or more replacement measured quantities.

In some embodiments, the text processor 224 is implemented as a rules-based natural language processing (NLP) algorithm. In other embodiments, the text processor 224 may classify the instances of text into categories, e.g., name of item, amount, total price. Further, the text processor determines the amount and the total price for the item spatially by determining the corresponding text. For example, the numerical values representing amount and total price closest to the item name on the receipt are associated with one another. The text processor 224 identifies the items and their associated amounts and prices for all instances of text within the receipt, as determined by the text extractor 222.

The training images 226 are a set of images tagged with metadata. The training images 226 are used to train the one or more machine learning models in the image processing module 216. The training images 226 includes images of receipts from warehouses, and each image is tagged with information, such as bounding boxes and identification of the text printed on the receipt, to train the text identifier 220 and/or the text extractor. The training images 226 may also include blurry images and images of other objects to train the quality checker 218.

The training images 226 may be tagged based on receipt information manually input to the online concierge system 102 by a picker 108 through the PMA 112. In some embodiments, the training images 226 are tagged by the text identifier 220 and text extractor 222 and provided to a picker 108 or an auditor for review. For instance, the picker 108 can either accept the tags as-is or edit the tags via the PMA 112, as discussed in FIGS. 6A-6F. Alternatively, an auditor may accept of edits the tags in an auditor mobile application displaying user interfaces comparable to those shown in FIGS. 6A-6F. In other examples, the training images 226 may be tagged by a third party. The training images 226 may reflect actual conditions of images of receipts in the real world, such as crumpled receipts that may distort labeling or lighting that over or under exposes portions of text.

The quality checker 218, the text identifier 220, and the text extractor 222 are trained by the image processing module 216 on the training images to determine relative weights of kernel functions within each machine learned model to provide a desired output, the outputs as described above in relation to each module. The kernel function weights may be randomly initialized, e.g., from a Gaussian distribution before training. In some embodiments, the image processing module 216 continually trains the quality checker 218, the text identifier 220, and the text extractor 222 responsive to a picker 108 adding new images to the training images 226.

Customer Mobile Application

Figure 3A:
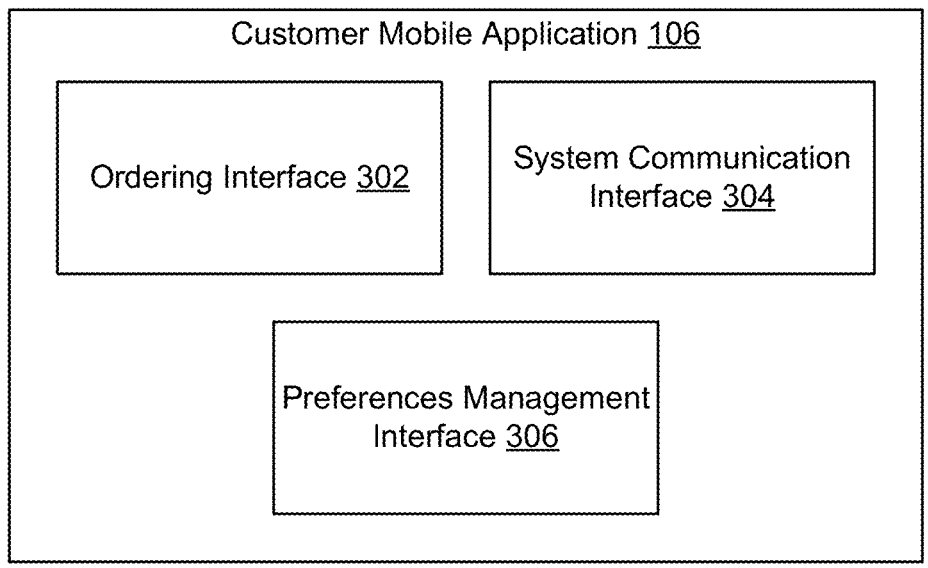
FIG. 3A is a diagram of a customer mobile application (CMA), according to one embodiment.

FIG. 3A is a diagram of the CMA 106, according to one embodiment. The CMA 106 includes an ordering interface 302, which provides an interactive interface with which the customer 104 can browse through and select products and place an order. The CMA 106 also includes a system communication interface 304 which, among other functions, receives inventory information from the online shopping concierge system 102 and transmits order information to the system 102. The system communication interface 304 also enables the customer 104 to submit a complaint or request to view an image of a receipt associated with their order if they believe they have been charged incorrectly for a variable weight item. The CMA 106 also includes a preferences management interface 306 which allows the customer 104 to manage basic information associated with his/her account, such as his/her home address, contact information, and payment instruments. The CMA 106 may communicate the basic information to the online concierge system 102, such that the online concierge system 102 may transmit receipts for the customer's orders including the actual amount of each order. The preferences management interface 306 may also allow the user to manage other details such as his/her favorite or preferred warehouses 110, preferred delivery times, special instructions for delivery, and so on.

Picker Mobile Application

Figure 3B:
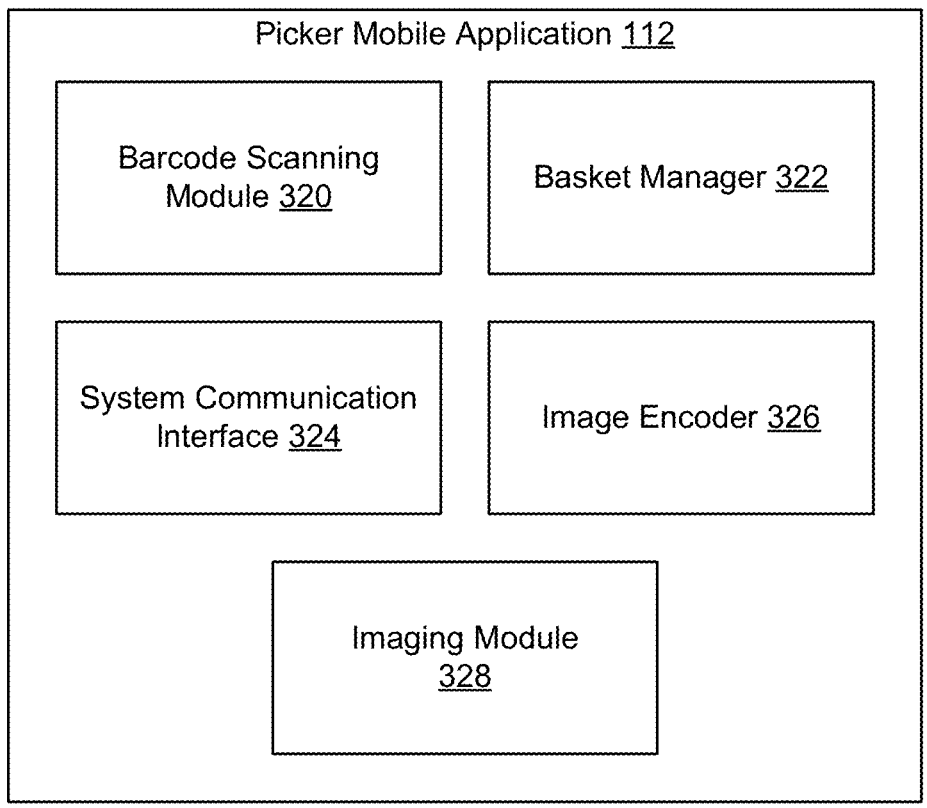
FIG. 3B is a diagram of a picker mobile application (PMA), according to one embodiment.

FIG. 3B is a diagram of the PMA 112, according to one embodiment. The PMA 112 includes a barcode scanning module 320 which allows a picker 108 to scan an item at a warehouse 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. PMA 112 also includes a basket manager 322 which maintains a running record of items collected by the picker 108 for purchase at a warehouse 110. This running record of items is commonly known as a "basket." In one embodiment, the barcode scanning module 320 transmits information describing each item (such as its cost, quantity, weight, etc.) to the basket manager 322, which updates its basket accordingly. The PMA 112 also includes a system communication interface 324 which interacts with the online shopping concierge system 102. For example, the system communication interface 324 receives an order from the system 102 and transmits the contents of a basket of items to the system 102. The PMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

The PMA 112 includes an imaging module 328, which allows a picker 108 to collect images of receipts via a camera of a mobile device (e.g., cell phone, tablet, or any electronic device with standard communication technologies). In some embodiments, the imaging module 328 additionally allows a picker 108 to collect images of items available at a warehouse when an item in the order is unavailable, e.g., by taking a photograph of one or more items in a warehouse. In another embodiment, the imaging module 328 may also provide an interface for the picker 108 to confirm image of the receipt and/or the identified contents of the receipt, as discussed in greater detail with respect to FIGS. 5A-5C and 6A-6C. In some embodiments, the imaging module 328 also allows a picker 108 or an auditor to indicate the location and type of an item label in a collected image. For example, a picker 108 (or auditor, who may receive the images via an auditor mobile application for review) may draw a bounding box around an instance of text to indicate that the identified pixels are associated with an instance of text, and select a class associated with the instance of text. The imaging module 328 sends the image of the receipt with the tagged instances of text and their associated classes to the online concierge system 102, which are incorporated into the training images 226.

Determining Cost of Order

Figure 4:
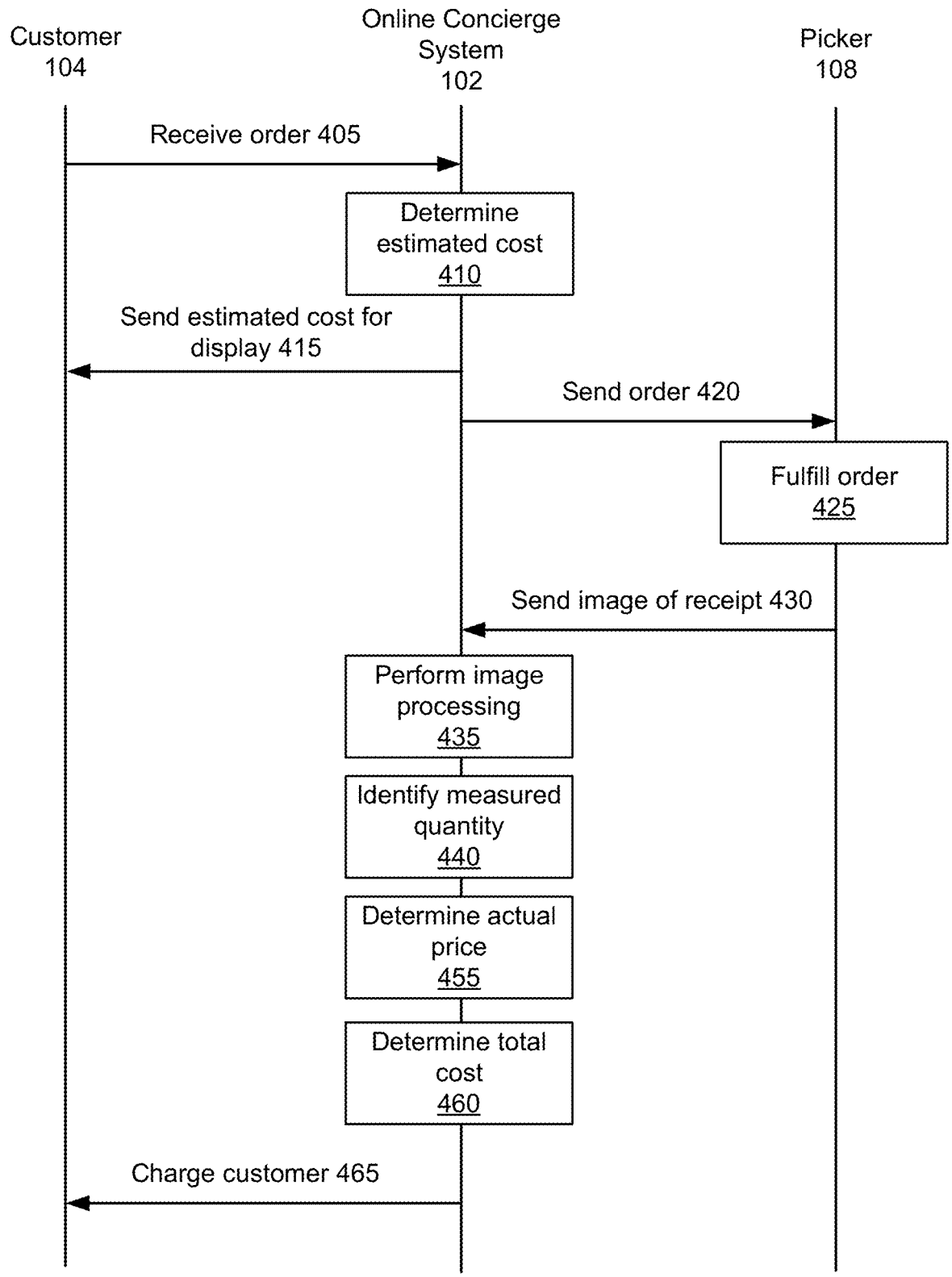
FIG. 4 is a flowchart illustrating a process for determining an actual price of an item based on discrepancies between an ordered amount and an actual amount purchased of the item, according to one embodiment.

FIG. 4 is a flowchart illustrating a process 400 for determining an actual price of an item based on discrepancies between an ordered amount and an actual amount purchased of the item, according to one embodiment. The customer 104 creates an order by selecting a set of items for purchase through the ordering interface 302 of the CMA 106. The order may specify the set of items for purchase at one or more warehouses 110 (e.g., retailers). The online concierge system 102 receives 405 the order from the customer 104. The online concierge system 102 may receive 405 the order via the CMA 106, as discussed in related to FIG. 1.

The online concierge system 102 determines 410 an estimated cost associated with the order. The estimated cost is determined 410 based on the quantities of each item specified by the order and an estimated unit price of each item, as stored in the inventory database 204. In one embodiment, the order fulfillment engine 206 may determine 410 the estimated cost. The online concierge system 102 sends the estimated cost for display via the ordering interface 302 of the CMA 106.

The online concierge system 102 sends 420 the order information to the picker 108. The picker 108 receives the order information via the PMA 112. The order fulfillment engine 206 interacts with the picker management engine 210 to select the picker 108 from a set of available pickers.

The picker 108 fulfills 425 the order. The picker 108 goes to one or more warehouses 110 picks and purchases each item as specified in the order. The pickler 108 may use the PMA 112 to keep track of the order and the progress of the fulfillment. Subsequent to fulfillment, the picker 108 takes an image of the receipt of the order. In an embodiment where the picker 108 must go to multiple warehouses 110 to fulfill an order, the picker 108 takes an image of each receipt from each warehouse 110 in the process of fulfilling the order.

The picker 108 sends 430 the image of the receipt to the online concierge system 102. The picker 108 may take the image of the receipt using the imaging module 328 of the PMA 112, which integrates with a camera on the picker's mobile device. The image of the receipt can be sent 430 to the online concierge system 102 using the PMA 112.

The online concierge system 102 performs 435 image processing on the image of the receipt. The image processing is performed by the image processing module 216. As described in relation to the image processing module 216, the image processing includes machine learning models and OCR to identify and extract text from the image of the receipt. In particular, the text identifier 220 determines location of text within the receipt, such as by a bounding box, and the text extractor 222 determines the words and numerical values of the text, for example using OCR. Further, in some embodiments, the image processing may contain an initial step, performed by the quality checker 218, of determining whether the image is of sufficient quality to resolve the text of the receipt.

The online concierge system 102 identifies 440 a measured quantity within the image of the receipt. Based on the words and numerical values determined by the image processing, the online concierge system 102 uses the text processor 224 to determine an item on the receipt and its associated amount, such as a measured quantity, and its associated price. The amount and price are reflective of that actually purchased by the picker since the values are extracted from the image of the receipt.

The online concierge system 102 determines 445 an actual price of the item in the order based on the measured quantity identified within the image. In one embodiment, the order fulfillment engine 206 determines an actual price by calculating the actual price based on the measured quantity the item and an estimated unit price of the item. Furthermore, the online concierge system 102 may determine an actual price of multiple items in the order if multiple items are associated with measured quantities.

The online concierge system 102 determines 460 a total cost of the order based on the actual price of the item (or items, in some embodiments). In particular, the online concierge system 102 sums the prices of each item in the order using the actual price of items determined based on measured quantities. The online concierge system 102 charges 465 the customer for the total cost of the order and may send the total cost for display via the ordering interface 302 of the CMA 106.

In some embodiments, the online concierge system 102 may charge the customer 104 for the estimated cost of the order, and subsequently determines a price adjustment for the order based on the difference between the quantity specified in the order by the customer 104 and the identified 440 quantity of the item in the receipt. If the quantity of the item identified 440 in the receipt is the same as that specified by the customer 104 in the order, the adjustment may be null. In other embodiments, the order fulfillment engine 206 determines a price adjustment based on the difference between the estimated price of an item provided to the customer 104 and the price for the item extracted from the image of the receipt. Furthermore, in these embodiments, the order fulfillment engine may adjust the cost of the order based on a net sum of adjustments for each item in the order.

In these embodiments, the online concierge system 102 sends an adjusted price to the customer 104 based on the actual amounts purchased in the order where the adjusted price is the actual cost of the order. The order fulfillment engine 206 either charges or reimburses the customer 104 based on the price adjustment, or the net price adjustment across all items in the order. The order fulfillment engine 206 accesses the transaction records database 208 to appropriately charge or refund the payment instrument of the customer 104.

The process 400 provides an improved method for delivery systems. The customer 104 is charged the correct amount based on the quantity of items actually purchased. Therefore, the customer 104 is not overcharged for the items in the order. Additionally, the automated image processing and analysis performed by the online concierge system 102 to determine the amounts actually purchased of each item in the receipt based on an image reduces the input time and effort of the picker 108. The process 400 improves equitability of cost.

Figure 5A:
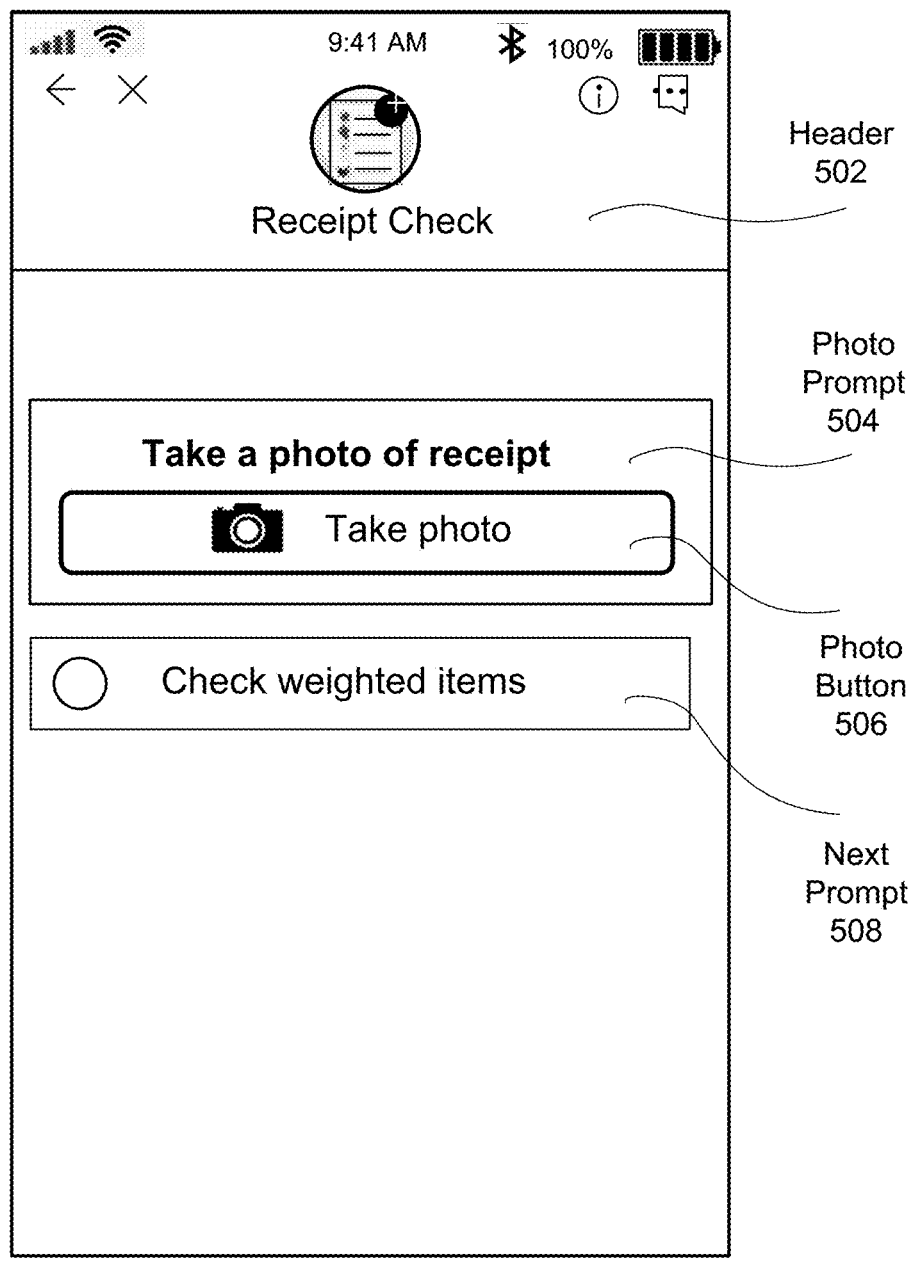
FIG. 5A-5C are example user interfaces for the picker to input training data via the PMA, according to one embodiment.
Figure 5B:
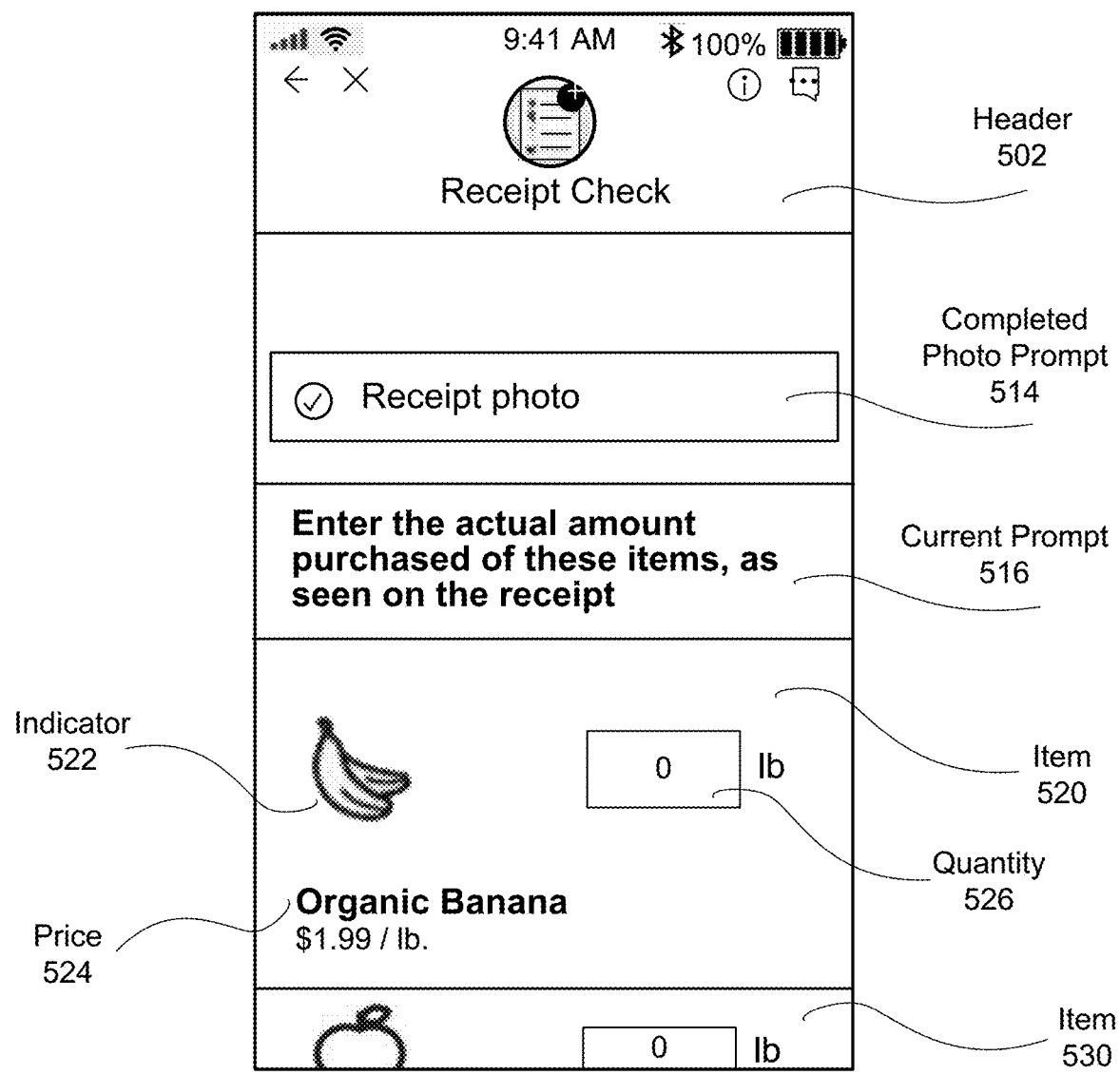
Figure 5C:
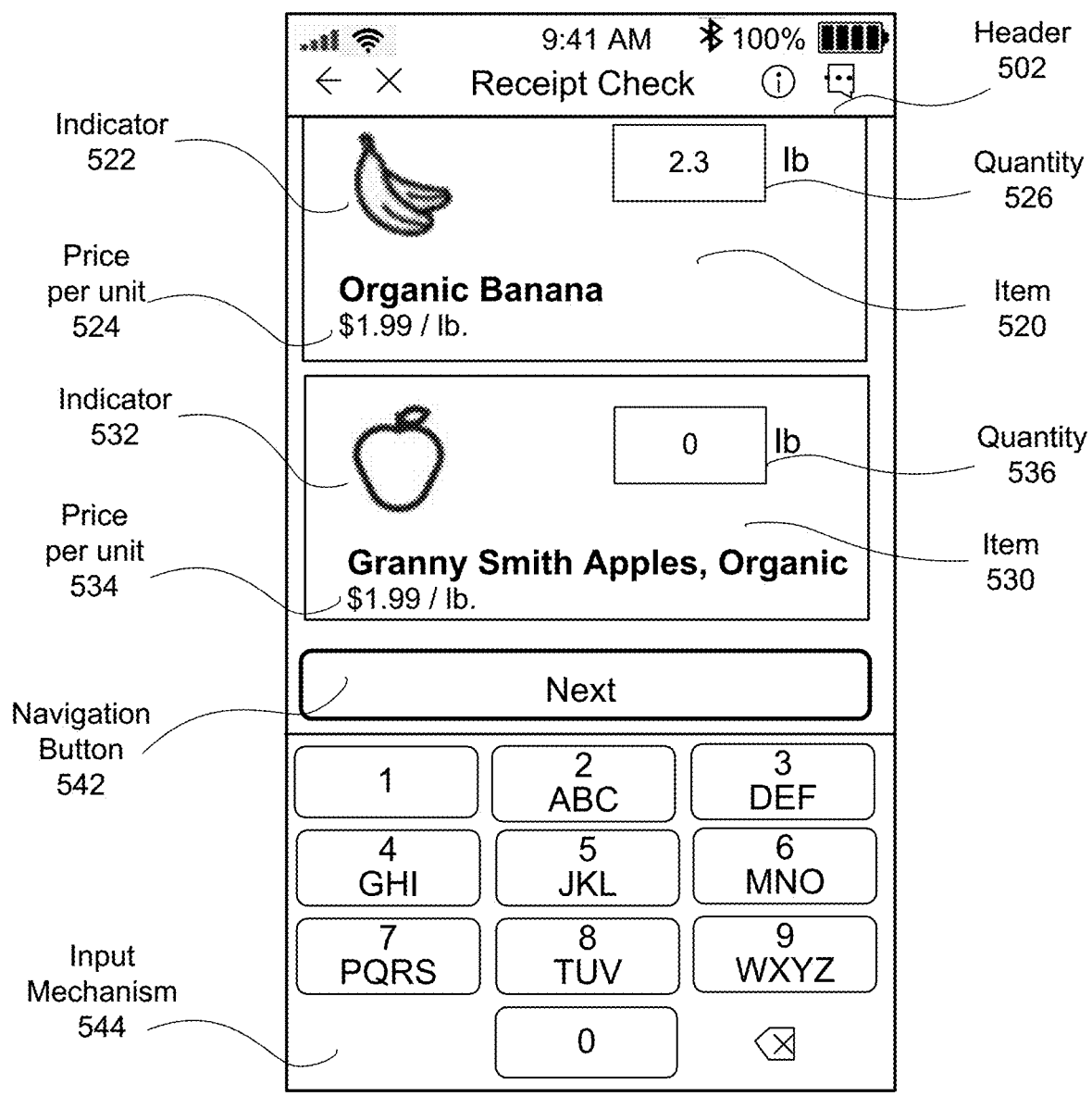

FIG. 5A-5C are example user interfaces for the picker to input training data via the PMA, according to one embodiment. The user interfaces shown in FIGS. 5A-5C are example embodiments of displays generated by the PMA 112 on a mobile device. Alternate embodiments may include additional or fewer features or otherwise be structured and displayed differently in a user interface. The data input via the example user interfaces of FIGS. 5A-5C is stored in the training images 226.

FIG. 5A shows a user interface 500 prompting the picker 108 to capture an image of the receipt. The interface 500 may be displayed to the picker 108 via the PMA 112, in particular via the imaging module 328, subsequent to purchase of some or all of a set of items specified in an order. For example, the user interface 500 may be provided for display by the imaging module 328 responsive to the PMA 112 receiving an indication from the picker 108 that one or more items in the order have been purchased.

The user interface 500 includes a header 502, which includes an indication that this stage of the fulfillment of the order is a receipt check. The header 502 also includes other indications of time, data signal, and/or battery, as consistent with the operating system of the mobile device running the PMA 112. The user interface 500 includes a photo prompt 504 which indicates an action item for the picker 108 is to take a photo of the receipt. The photo prompt 504 includes a photo button 506, which the picker 108 selects to take a photo of the receipt. When selected, the photo button launches a camera attached to or associated with the mobile device running the PMA 112. The picker 108 uses the camera to take an image of the receipt. In another embodiment, the photo prompt 504 enables the picker to upload an existing image of the receipt. The user interface 500 also includes a next prompt 508, which indicates a future action item is to check weighted items, as discussed in greater detail below.

FIG. 5B shows a user interface 510 prompting the picker 108 to enter an actual amount purchased of each item on the receipt. The user interface 510 includes the header 502. The user interface 510 also includes a completed photo prompt 514 indicating that the picker 108 has successfully uploaded a photo using the imaging module 328.

The user interface 510 includes a current prompt 516 prompting the picker 108 to enter the actual amount purchased of each item as seen on the receipt. The interface 510 further includes a first item 520 for which the picker has been prompted to enter the actual amount purchased. The first item 520 includes an indicator 522, which may be an image, a graphic, and/or a name of the first item 520. The first item 520 includes a price per unit 524 that indicates a unit price or price per weight of the first item 520. The first item 520 includes a quantity 526, which is an empty field for the user to enter the actual amount purchased of the first item 520 as printed on the receipt.

In one embodiment, the PMA 112 provides for display the first item 520, including the indicator 522 and the price per unit 524, based on data received about the order from the online concierge system 102. In particular, the indicator 522 and the price per unit 524 may be data about the first item 520 that has been stored in the inventory database 204. That is, the PMA 112 provides for display each of the items in the order that have a variable weight for the picker 108 to provide the actual amount purchased. In some embodiments, the PMA 112 provides for display all the items included in the order (i.e., not just the variable weight items) to be able to tag and classify each instance of text in the image of the receipt for use in the training images 226. The picker 108 selects the quantity 526 and manually inputs the actual amount purchased on the first item 520 as printed on the receipt.

In some embodiments, the user interface 510 includes a second item 530 for which the picker has been prompted to enter the actual amount purchased. The PMA 112 may provide for display fields including an indicator, a price per unit, and a quantity for the item 530 as the picker 108 interacts with the user interface 510 (e.g., completes the quantity 526 for the first item 520, scrolls down the user interface 510).

FIG. 5C shows a user interface 540 prompting the picker 108 to enter an actual amount purchased of the second item 530 on the receipt. The user interface 540 may be provided for display by the PMA 112 after the picker 108 inputs the actual amount purchased of the first item 520. The user interface 540 includes the header 502, which is reduced in size as the user navigates through the items 520, 530. The user interface includes the item 520, further including the indicator 522, the price per unit 524, and the quantity 526. In the embodiment shown by the user interface 540, the picker has manually input the actual amount purchased of 2.3 lbs. in the field for the quantity 526.

The user interface 540 includes the second item 530 for which the picker has been prompted to enter the actual amount purchased. The second item 530 includes an indicator 532, which may be an image, a graphic, and/or a name of the second item 530. The second item 530 includes a price per unit 534 that indicates a unit price or price per weight of the second item 530. The second item 530 includes a quantity 536, which is an empty field for the user to enter the actual amount purchased of the second item 530 as printed on the receipt. In one embodiment, the PMA 112 provides for display the second item 530, including the indicator 532 and the price per unit 534, based on data received about the order from the online concierge system 102. In particular, the indicator 532 and the price per unit 534 may be data about the second item 530 that has been stored in the inventory database 204.

The user interface 540 further includes a navigation button 542, which when selected by the picker 108 navigates to the next item in the order. After the picker 108 has manually input the actual amount purchased in the quantity 536, the picker can select the navigation button 542 to manually input the actual amount purchased of the next item. The user interface 540 also includes an input mechanism 544 which enables the picker 108 to manually input values into the quantity 526, 536 fields. The input mechanism 544 may be a keyboard-like user interface provided for display and interaction as shown in the embodiment of FIG. 5C. In other embodiments, an input mechanism may be a physical keyboard, speech-to-text device, or any other means of manually inputting values.

The data input by the picker 108 via the user interfaces 500, 510, 540, including the image of the receipt and actual amounts purchased of items, is stored in the training images 226 and used to train machine learned models, such as the quality checker 218, the text identifier 220, and the text processor 224.

FIG. 6A-6F are example user interfaces for the picker to upload an image of a receipt via the PMA, according to one embodiment. The user interfaces shown in FIGS. 6A-6F are example embodiments of displays generated by the PMA 112 on a mobile device. Alternative embodiments may include additional or fewer features or otherwise be structured and displayed differently in a user interface. The data input via the example user interfaces of FIGS. 6A-6F is stored in the order database 230. The example interfaces shown in FIGS. 6A-6F are used to properly charge the customer 104 for actual amounts purchased of items in the order.

Figure 6A:
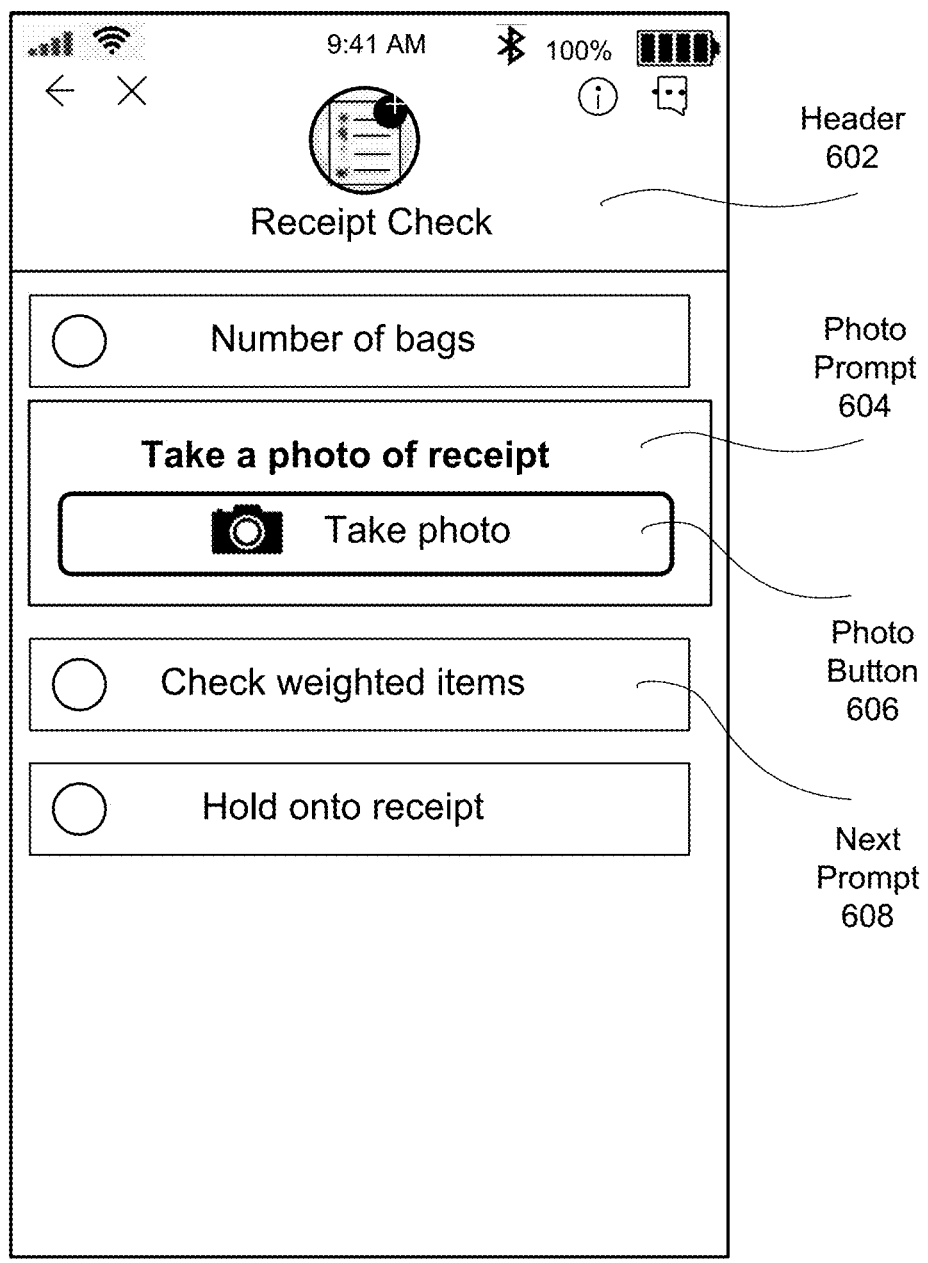
FIG. 6A-6F are example user interfaces for the picker to upload an image of a receipt via the PMA, according to one embodiment.

FIG. 6A shows a user interface 600 prompting the picker 108 to capture an image of the receipt. The interface 600 may be displayed to the picker 108 via the PMA 112, in particular via the imaging module 328, subsequent to purchase of some or all of a set of items specified in an order. For example, the user interface 600 may be provided for display by the imaging module 328 responsive to the PMA 112 receiving an indication from the picker 108 that one or more items in the order have been purchased.

The user interface 600 includes a header 602, which includes an indication that this stage of the fulfillment of the order is a receipt check. The header 602 also includes other indications of time, data signal, and/or battery, as consistent with the operating system of the mobile device running the PMA 112. The user interface 600 includes a photo prompt 604 which indicates an action item for the picker 108 is to take a photo of the receipt. The photo prompt 604 includes a photo button 606, which the picker 108 selects to take a photo of the receipt. When selected, the photo button launches a camera attached to or associated with the mobile device running the PMA 112. The picker 108 uses the camera to take an image of the receipt. In another embodiment, the photo prompt 604 enables the picker to upload an existing image of the receipt. The user interface 600 also includes a next prompt 608, which indicates a future action item is to check weighted items, as discussed in greater detail below, and may include more prompts before or after the photo prompt 604 and next prompt 608. In some instances, the user interface 600 may additionally include a text box that shares feedback with the picker 108 on the quality of the image and/or positioning recommendations for the camera to improve image quality as the picker 108 uses the camera to take images.

Figure 6B:
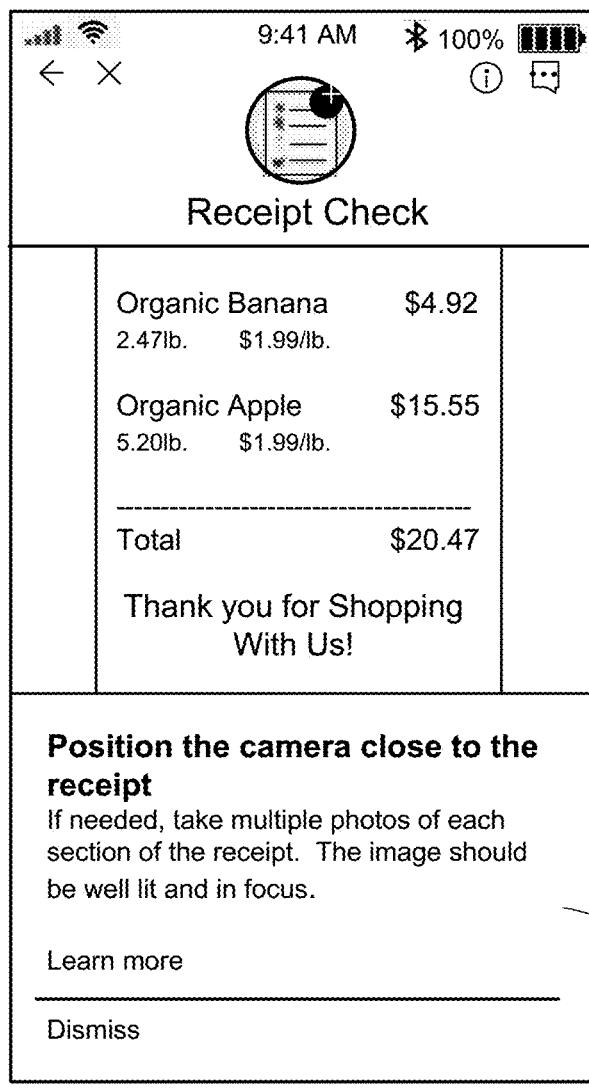

FIG. 6B shows a user interface 610 including capture information 611 for the picker capturing the image. The capture information includes a description of how to position the camera to capture the picture and describes that in some instances, the picker may need to capture multiple images to capture the entire receipt. The user interface 610 may include further widgets the user may interact with to dismiss the capture information 611, learn more about the capture information, and exit out of the user interface 610.

Figure 6C:
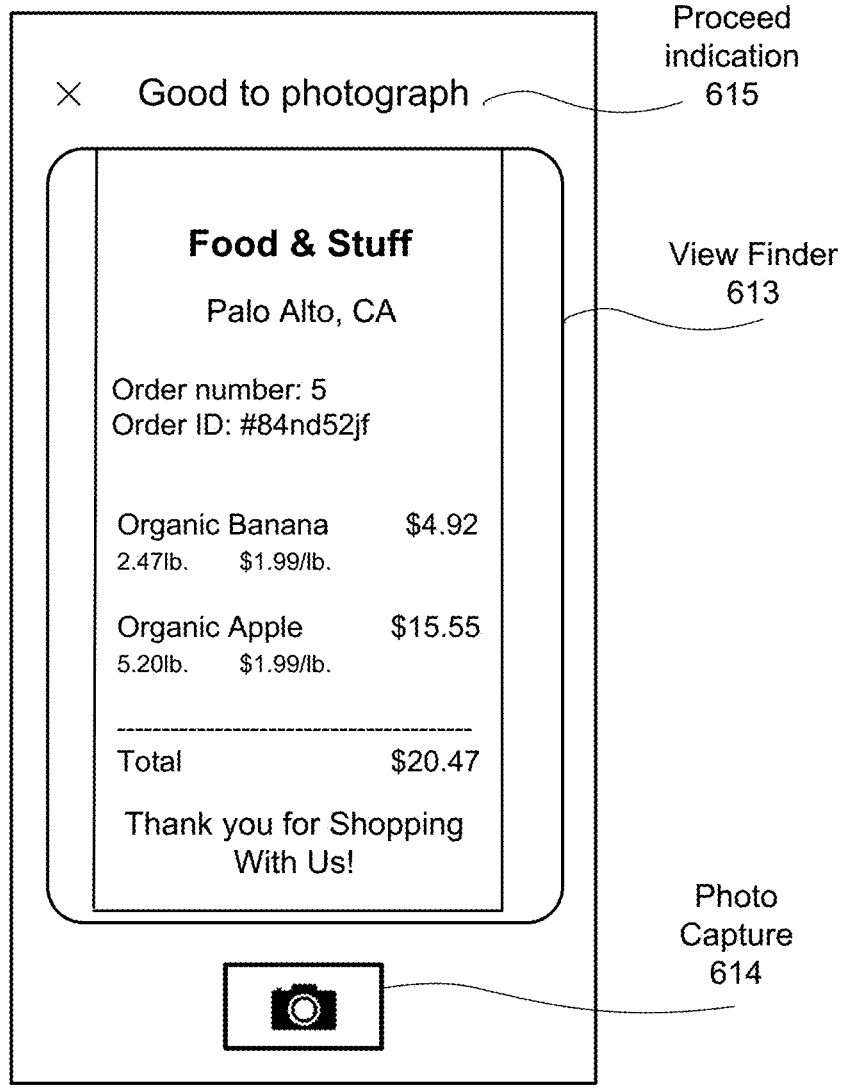

FIG. 6C shows a user interface 612 enabling the picker 108 to capture an image of the receipt. The user interface 612 shows a view finder 613 enabling the picker 108 to view the area the imaging module 328 is ready to capture. In the embodiment shown in FIG. 6C, the view finder 613 contains an image of the receipt 614. The user interface 612 includes a proceed indication 615 that indicates whether the image of the receipt as shown in the view finder 613 is ready for capture based on an assessment of image quality. To capture the image of the receipt 614 shown in the view finder 613, the picker selects photo capture 614. When the picker 108 selects the photo capture 614, the image of the receipt in the view finder 613 is captured and provided by the PMA 112 to the online concierge system 102. In some embodiments, if the receipt is double-sided or too long to fit in one image, the picker may capture multiple images that are provided to the PMA 112. The image processing module 216 processes the image of the receipt and identifies the actual amount purchased of each item.

Figure 6D:
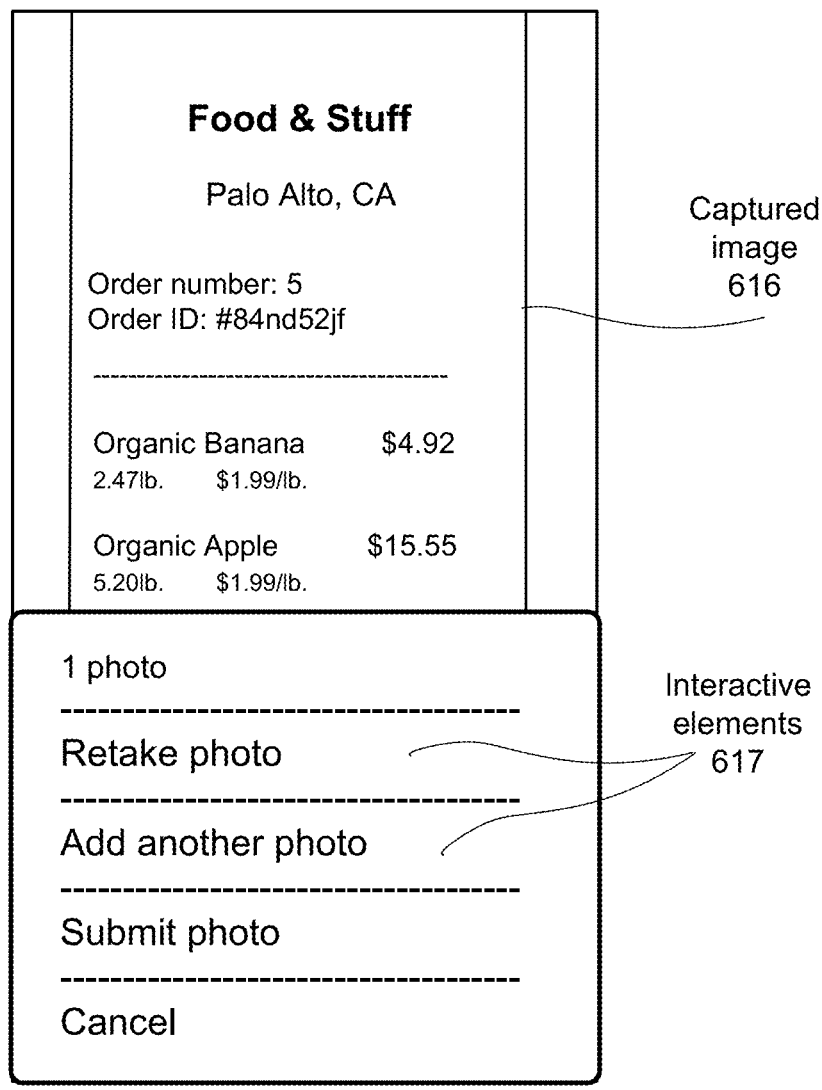

FIG. 6D shows a user interface 615 depicting the captured image 616 of the receipt. The user interface 615 prompts the picker 108 to select one of the interactive elements 617 to either retake the captured image, which leads back to the user interface 612 shown in FIG. 6C, add another image of the receipt, submit the captured image 616, or cancel the uploading the captured image 616 of the receipt. If the picker 108 selects to submit the photo via the interactive elements 617, the PMA 112 may display the user interface of FIG. 6E. Alternatively, the online concierge system 102 may transmit the captured image 616 (or images, in some embodiments) to an auditor mobile application, as shown in FIG. 7.

Figure 6E:
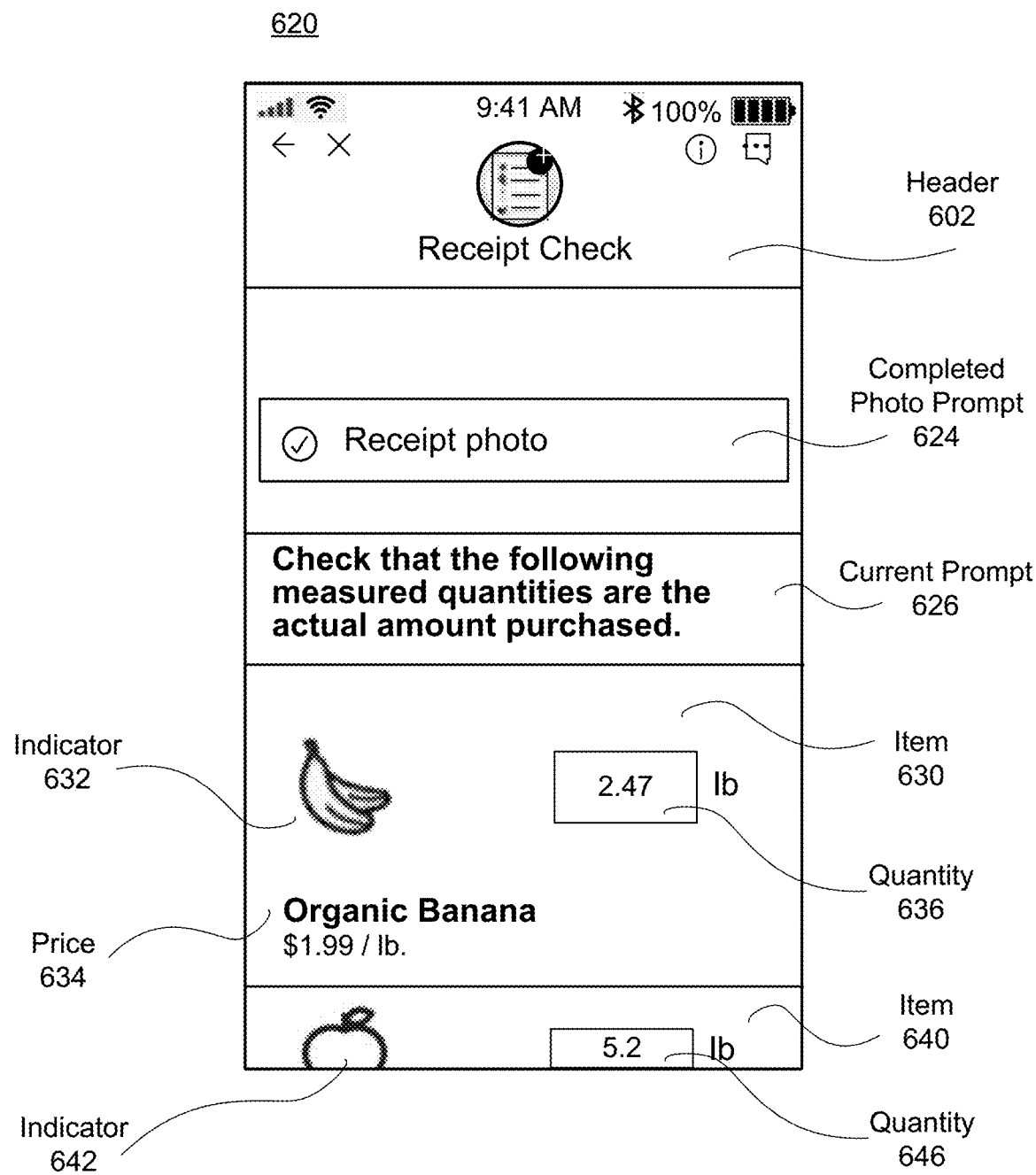
Figure 7:
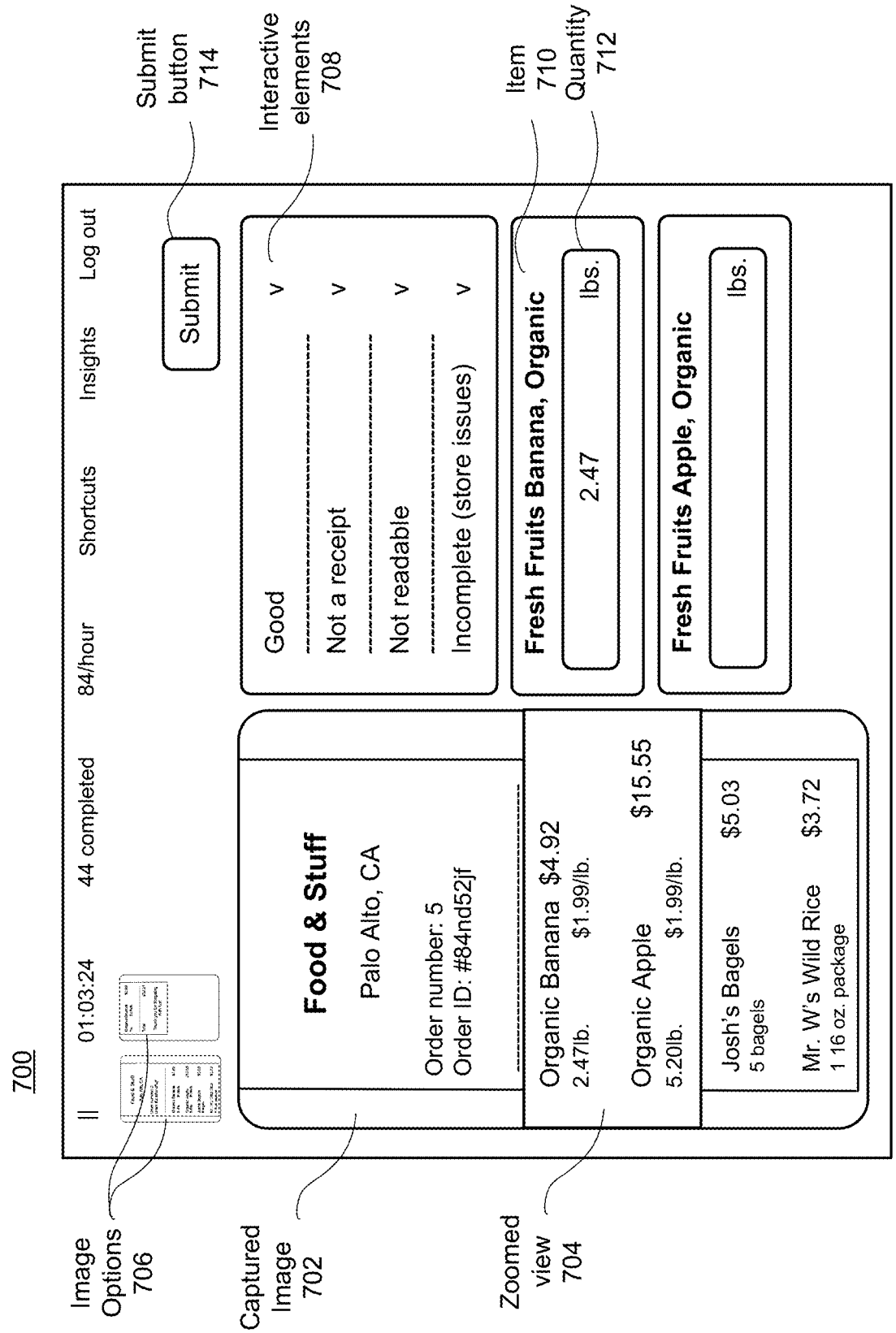
FIG. 7 is an example user interface for an auditor to enter measured quantities for a receipt, according to one embodiment.

FIG. 6E shows a user interface 620 prompting the picker 108 to check each measured quantity of each item on the receipt is the actual amount purchased. The user interface 620 includes the header 602. The user interface 620 also includes a completed photo prompt 624 indicating that the picker 108 has successfully uploaded a photo using the imaging module 328.

The user interface 620 includes a current prompt 626 prompting the picker 108 to check that each identified measured quantity is the actual amount purchased of each item. That is, the picker 108 is checking that the image processing module 216 correctly identified the actual amount purchased of each item. The user interface 620 further includes a first item 630 for which the picker has been prompted to check that the measured quantity is the actual amount purchased. The first item 630 includes an indicator 632, which may be an image, a graphic, and/or a name of the first item 630. The first item 630 includes a price per unit 634 that indicates a unit price or price per weight of the first item 630. The first item 630 includes a quantity 636, which is a field populated with a measured quantity of the first item 630 as identified in the image of the receipt by the image processing module 216.

In one embodiment, the PMA 112 provides for display the first item 630, including the indicator 632 and the price per unit 634, based on data received about the order from the online concierge system 102. In particular, the indicator 632 and the price per unit 634 may be data about the first item 630 that has been stored in the inventory database 204. In another embodiment, the image processing module 216 identifies the items, prices, and quantities from the image of the receipt and provides them for display to the PMA 112. The PMA 112 provides for display each of the variable weight items in the order for the picker 108 to check the actual amount purchased is correct.

In some embodiments, the user interface 620 includes a second item 640, which also includes an indicator 642, a price per unit 644 (shown in FIG. 6F), and a quantity 646. The PMA 112 may provide for display the indicator 642, the price per unit 644, and the quantity 646 in full as the picker 108 interacts with the user interface 620 (e.g., checks the quantity 636 for the first item 630, scrolls down the user interface 620).

Figure 6F:
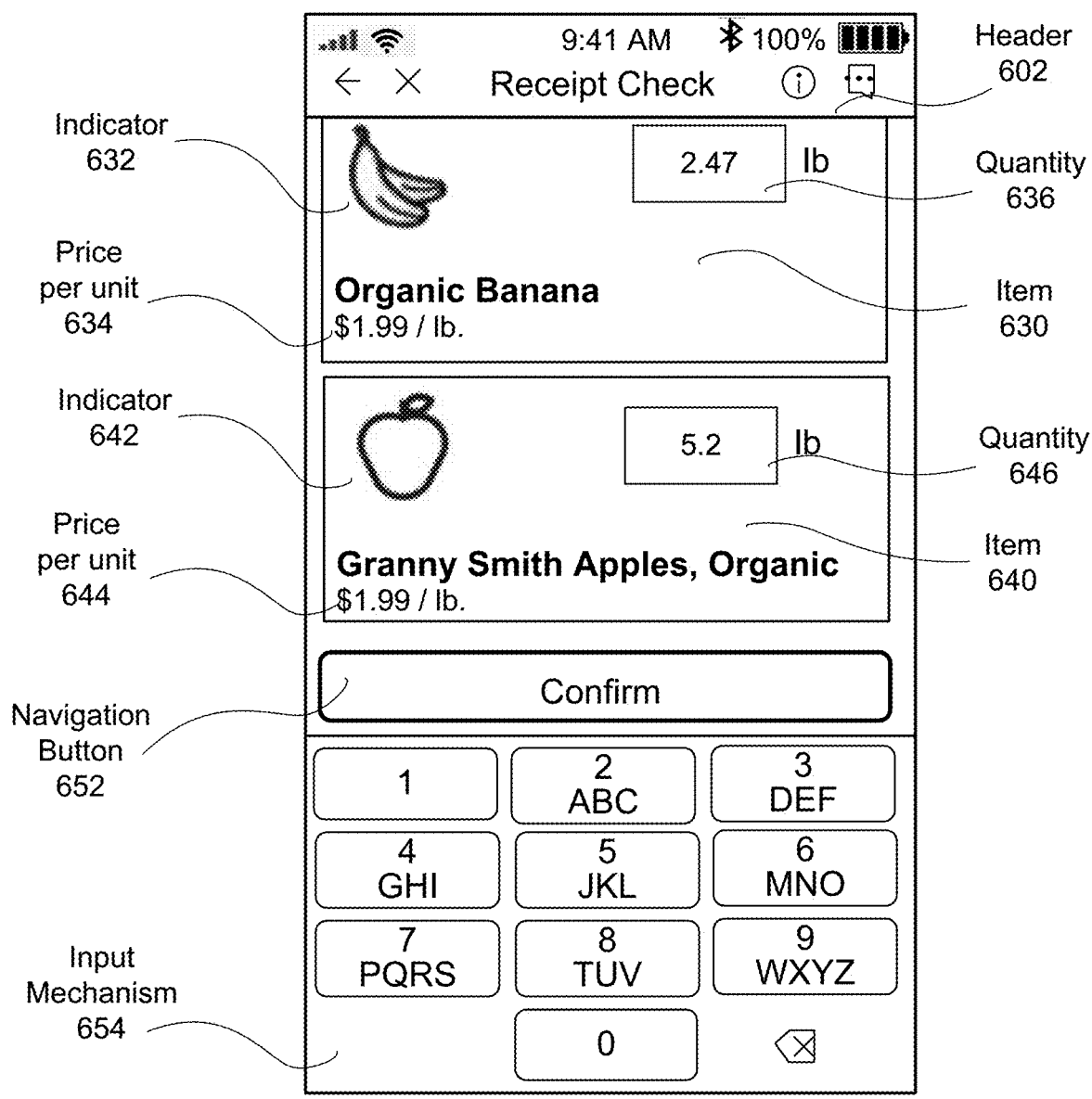

FIG. 6F shows a user interface 650 prompting the picker 108 to check whether the measured quantity of the second item 640 is the actual amount purchased of the second item 640. The user interface 650 may be provided for display by the PMA 112 after the picker 108 verifies the quantity 636 is the actual amount purchased of the first item 630. The user interface 650 includes the header 602, which is reduced in size as the user navigates through the items 630, 640. The user interface includes the item 630, further including the indicator 632, the price per unit 634, and the quantity 636. In the embodiment shown by the user interface 650, the picker has manually confirmed the actual amount purchased of 2.47 lbs. in the field for the quantity 636.

The user interface 650 includes the second item 640 for which the picker has been prompted to confirm whether the quantity 646 is the actual amount purchased. The quantity 646 field has been populated based on the measured quantity of the second item 640 identified by the image processing module. The picker 108 uses a navigation button 652 to manually confirm the quantity 646 matches the actual amount purchased of the second item 640 as printed on the receipt. Selecting the navigation button 652 the confirm the actual amount purchased also navigates the picker to the next item to be confirmed.

If the quantity 646 identified by the image processing module 216 is incorrect (i.e., does not match the actual amount purchased as printed on the receipt), the picker 108 uses the input mechanism 654 to manually input the actual amount purchased of the second item 640. The input mechanism 654 is substantially similar to the input mechanism 544. In some embodiments, when the input mechanism 654 is used to correct the quantity 646 with the actual amount purchased, the associated data is used to re-train the machine-learned models. That is, the actual amount purchased and the image of the receipt are added to the training images 226 and used by the image processing module 216 to re-train the quality checker 218, the text identifier 220, and the text extractor 222.

When the picker 108 has finished verifying that all measured quantities are the actual amounts purchased, or otherwise inputting the actual amounts purchased, the PMA 112 provides the actual amounts purchased to the online concierge system 102. The online concierge system 102 charges the customer 104 based on the amounts actually purchased, as previously discussed.

FIG. 7 is an example user interface 700 for an auditor to enter measured quantities for a receipt, according to one embodiment. The user interface shown in FIG. 7 is an example embodiment of displays generated by an auditor mobile application 112 on a computing device. The computing device may be a mobile device or any suitable computing device. Alternative embodiments of FIG. 7 may include additional or fewer features or otherwise be structured and displayed differently in a user interface. The data input via the example user interface of FIG. 7 is stored in the order database 230. The example user interface 700 shown in FIG. 7 is used to determine an actual amount of an order and properly charge the customer 104 the actual amount instead of an estimated cost for an order.

The user interface 700 allows an auditor to check that each identified measured quantity is the actual amount purchased of each item. That is, the auditor checking that the image processing module 216 correctly identified the actual amount purchased of each item. The user interface 700 may be displayed to the auditor subsequent to purchase of some or all of a set of items specified in an order. For example, the user interface 700 may be provided for display to the auditor by the imaging module 328 responsive to the PMA 112 receiving an indication from the picker 108 that one or more items in the order have been purchased.

The user interface 700 includes a captured image 702 of a receipt of the order. In embodiment where the receipt is pictured in multiple images, the auditor may choose which captured image 702 of the receipt to view via the image options 702. The user interface 700 also includes a zoomed view 704 of a portion of the receipt, which the auditor may move around via the user interface 700 to view magnified portions of the captured image 702. The user interface may display statistics for the auditor, such as time spent reviewing receipts, and number of receipts reviewed, number of receipts viewed over time and include widgets for viewing shortcuts, viewing insights, or logging out of the auditor's auditing account.

The user interface 700 includes a number of interactive elements 708 that the auditor may interact with to indicate information about the captured image 702. For instance, the auditor may interact with the interactive elements 708 of the user interface 700 to indicate that the captured image 702 of the receipt is good for use, is not actually a receipt, is unreadable, or is incomplete, among other information. The user interface 700 also includes text fields (or other interactive elements) in which the auditor may enter an actual quantity 712 of an item 710 purchased for the order based on the captured image 702. In some embodiments, the user interface 700 may additionally display an amount of each item 710 identified by image processing module 216. The text fields correspond to items 710 shown in the zoomed view 704 and may update as the auditor moves the zoomed view 704. In the embodiment shown in FIG. 7, the auditor has manually input the actual amount of bananas purchased of 2.47 lbs. in the text field for the quantity 526.

Furthermore, the user interface 700 includes a submit button 714, which the auditor may interact with to confirm the information entered via the interactive elements 708 and quantities 712 entered for the items 710. The auditor may interact with the submit button 714 to indicate that all quantities 712 on the receipt have been entered. When the auditor 108 has finished entering all quantities 712, the auditor mobile application provides the actual amounts (e.g., quantities 712) purchased to the online concierge system 102. The online concierge system 102 may access the inventory database 204 to determine a correct cost (i.e., actual cost) of each item and charges the customer 104 based on the amounts actually purchased, as previously discussed.

In some embodiments, each captured image 702 of a receipt may be shown via user interface 700 to an auditor for review. In other embodiments, an auditor is only shown a captured image of a receipt if one or more quantities 712 identified by the image processing module 216 are incorrect (i.e., does not match the actual amount purchased as printed on the receipt). In these embodiments, the auditor manually input the quantity 712 of each item purchased. Furthermore, in some instances, when the auditor corrects one or more quantities 712 for a receipt, the associated data is used to re-train the machine-learned models described above. That is, the actual amount purchased and the captured image 702 of the receipt are added to the training images 226 and used by the image processing module 216 to re-train the quality checker 218, the text identifier 220, and the text extractor 222. The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which includes any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving an order from a customer, the order comprising an item having a price that depends on an actual amount of the item purchased, the order specifying an ordered amount of the item;
   determining an estimated cost for the order, where the estimated cost is determined based on the price and the ordered amount of the item;
   sending the estimated cost for the order to the customer for display via a user interface;
   sending the order to a shopper for fulfillment at a store;

receiving an image of a receipt for the order from the shopper after fulfillment of the order;

applying an image processing algorithm to identify the item in the image of the receipt;

identifying a measured quantity within the image, the measured quantity representing the actual amount of the item purchased at the store;

determining an actual price of the item based on the measured quantity identified within the image; and determining a total cost of the order based on the determined actual price of the item.

2. The method of claim 1, further comprising:

displaying the image of the receipt to an auditor;

displaying, to the auditor, a notification comprising a selectable option to confirm whether the image is readable.

3. The method of claim 1, further comprising:

displaying, to an auditor, a notification comprising the identified item, the identified measured quantity, an option to confirm the identified measured quantity is the ordered amount, and an alternate option to decline the identified measured quantity and input a correct ordered amount.

4. The method of claim 3, further comprising:

displaying, to the auditor, a highlighted version of the image, wherein the identified item and the identified measured quantity are highlighted.

5. The method of claim 1, further comprising:

determining whether the image of the receipt is of sufficient quality to resolve text of the receipt;

responsive to determining the image of the receipt is not of sufficient quality, prompting the shopper to take another image of the receipt.

6. The method of claim 1, wherein identifying the measured quantity within the image comprises:

displaying, to an auditor, an image of the receipt; and receiving, from the auditor, the measured quantity of the item entered via a user interface presented to the auditor.

7. The method of claim 1, further comprising:

charging the customer for the order based on the estimated cost;

responsive to the actual amount being greater than the ordered amount, charging the customer a price adjustment based on the actual price; and responsive to the actual amount being less than the ordered amount, reimbursing the customer the price adjustment based on the actual price.

8. The method of claim 1, further comprising:

charging the customer based on the total cost.

9. The method of claim 1, wherein the image processing comprises a machine learning model that has been trained to identify an actual amount purchased for an item in an image of a receipt.

10. The method of claim 9, wherein the machine learning model is trained on a plurality of training images, each training image comprising one or more items associated with an actual amount purchased.

11. A non-transitory computer-readable storage medium storing instructions, the instructions when executed cause a processor to:

receive an order from a customer, the order comprising an item having a price that depends on an actual amount of the item purchased, the order specifying an ordered amount of the item;

determine an estimated cost for the order, where the estimated cost is determined based on the price and the ordered amount of the item;

send the estimated cost for the order to the customer for display via a user interface;

send the order to a shopper for fulfillment at a store;

receive an image of a receipt for the order from the shopper after fulfillment of the order;

apply an image processing algorithm to identify the item in the image of the receipt;

identify a measured quantity within the image, the measured quantity representing the actual amount of the item purchased at the store;

determine an actual price of the item based on the measured quantity identified within the image; and determining a total cost of the order based on the determined actual price of the item.

12. The computer-readable storage medium of claim 11, further comprising instructions when executed cause the processor to:

provide for display the image of the receipt to an auditor;

provide for display, to the auditor, a notification comprising a selectable option to confirm whether the image is readable.

13. The computer-readable storage medium of claim 11, further comprising instructions when executed cause the processor to:

provide for display, to an auditor, a notification comprising the identified item, the identified measured quantity, an option to confirm the identified measured quantity is the ordered amount, and an alternate option to decline the identified measured quantity and input a correct ordered amount.

14. The computer-readable storage medium of claim 13, further comprising instructions when executed cause the processor to:

provide for display, to an auditor, a highlighted version of the image, wherein the identified item and the identified measured quantity are highlighted.

15. The computer-readable storage medium of claim 11, further comprising instructions when executed cause the processor to:

determine whether the image of the receipt is of sufficient quality to resolve text of the receipt;

responsive to determining the image of the receipt is not of sufficient quality, prompt the shopper to take another image of the receipt.

16. The computer-readable storage medium of claim 11, wherein the instructions to identify a measured quantity within the image further comprises instructions that when executed cause the processor to:

provide for display, to an auditor, an image of the receipt; and receive, from the auditor, the measured quantity of the item entered via a user interface presented to the auditor.

17. The computer-readable storage medium of claim 11, further comprising instructions when executed cause the processor to:

charge the customer for the order based on the estimated cost;

responsive to the actual amount being greater than the ordered amount, charge the customer a price adjustment based on the actual price; and responsive to the actual amount being less than the ordered amount, reimburse the customer the price adjustment based on the actual price.

18. The computer-readable storage medium of claim 11, further comprising instructions when executed cause the processor to:
   charge the customer based on the total cost.

19. The computer-readable storage medium of claim 11, wherein the image processing comprises a machine learning model that has been trained to identify an actual amount purchased for an item in an image of a receipt.

20. The computer-readable storage medium of claim 19, wherein the machine learning model is trained on a plurality of training images, each training image comprising one or more items associated with an actual amount purchased.

\* \* \* \* \*